(12) United States Patent
Kim et al.

(10) Patent No.: US 11,594,719 B2
(45) Date of Patent: Feb. 28, 2023

(54) LITHIUM ELECTRODE AND LITHIUM SECONDARY BATTERY INCLUDING SAME

(71) Applicant: LG CHEM, LTD., Seoul (KR)

(72) Inventors: Taek Gyoung Kim, Daejeon (KR); Jeehyun Ahn, Daejeon (KR); Doo Kyung Yang, Daejeon (KR); Eunkyung Cho, Daejeon (KR); Cholong Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 199 days.

(21) Appl. No.: 16/624,147

(22) PCT Filed: Feb. 8, 2018

(86) PCT No.: PCT/KR2018/001689
§ 371 (c)(1),
(2) Date: Dec. 18, 2019

(87) PCT Pub. No.: WO2018/236025
PCT Pub. Date: Dec. 27, 2018

(65) Prior Publication Data
US 2020/0235379 A1    Jul. 23, 2020

(30) Foreign Application Priority Data
Jun. 20, 2017   (KR) .................. 10-2017-0077994

(51) Int. Cl.
*H01M 4/134* (2010.01)
*H01M 4/04* (2006.01)
(Continued)

(52) U.S. Cl.
CPC ......... *H01M 4/134* (2013.01); *H01M 4/0423* (2013.01); *H01M 4/0435* (2013.01);
(Continued)

(58) Field of Classification Search
None
See application file for complete search history.

(56) References Cited

U.S. PATENT DOCUMENTS

| 6,025,094 A | 2/2000 | Visco et al. |
| 9,653,735 B2 * | 5/2017 | Skotheim ............ H01M 10/056 |

(Continued)

FOREIGN PATENT DOCUMENTS

| CN | 1492529 A | 4/2004 |
| CN | 1511351 A | 7/2004 |

(Continued)

OTHER PUBLICATIONS

International Search Report issued in PCT/KR2018/001689 (PCT/ISA/210), dated May 28, 2018.
(Continued)

*Primary Examiner* — Tracy M Dove
(74) *Attorney, Agent, or Firm* — Birch, Stewart, Kolasch & Birch, LLP

(57) ABSTRACT

A lithium electrode and a lithium secondary battery including the same. The lithium electrode has a surface oxide layer with a controlled thickness and surface roughness. The lithium electrode may be used as a negative electrode of a lithium secondary battery, for example, a lithium-sulfur secondary battery. A lithium-sulfur battery including the lithium electrode has an enhanced lifetime due to suppression of side reactions with polysulfide.

7 Claims, 2 Drawing Sheets

(51) Int. Cl.
*H01M 4/1395* (2010.01)
*H01M 4/136* (2010.01)
*H01M 4/36* (2006.01)
*H01M 4/38* (2006.01)
*H01M 4/62* (2006.01)
*H01M 10/052* (2010.01)

(52) U.S. Cl.
CPC ......... *H01M 4/136* (2013.01); *H01M 4/1395* (2013.01); *H01M 4/364* (2013.01); *H01M 4/38* (2013.01); *H01M 4/62* (2013.01); *H01M 10/052* (2013.01)

(56) References Cited

U.S. PATENT DOCUMENTS

| | | | |
|---|---|---|---|
| 2002/0012846 | A1 | 1/2002 | Skotheim et al. |
| 2004/0081889 | A1 | 4/2004 | Lee |
| 2004/0209159 | A1 | 10/2004 | Lee et al. |
| 2005/0003277 | A1 | 1/2005 | Lee et al. |
| 2005/0191547 | A1* | 9/2005 | Konishiike ......... H01M 10/052 429/231.95 |
| 2005/0238956 | A1 | 10/2005 | Lee |
| 2010/0173098 | A1 | 7/2010 | Nagata et al. |
| 2012/0027926 | A1 | 2/2012 | Miyuki et al. |
| 2012/0196175 | A1 | 8/2012 | Hida et al. |
| 2014/0154589 | A1 | 6/2014 | Wegner et al. |
| 2014/0272565 | A1 | 9/2014 | Gronwald et al. |
| 2016/0296246 | A1 | 10/2016 | Son et al. |
| 2017/0117547 | A1 | 4/2017 | Fanous et al. |
| 2017/0309899 | A1 | 10/2017 | Son et al. |
| 2018/0013147 | A1 | 1/2018 | Cho et al. |

FOREIGN PATENT DOCUMENTS

| | | |
|---|---|---|
| CN | 1577926 A | 2/2005 |
| CN | 101689630 A | 3/2010 |
| CN | 103502283 A | 1/2014 |
| CN | 105074968 A | 11/2015 |
| CN | 105122501 A | 12/2015 |
| CN | 105280886 A | 1/2016 |
| CN | 106463704 A | 2/2017 |
| EP | 3 547 411 A1 | 10/2019 |
| JP | 6-84512 A | 3/1994 |
| JP | 6-124700 A | 5/1994 |
| JP | 2009-21214 A | 1/2009 |
| JP | 2009-43523 A | 2/2009 |
| JP | 2012-17478 A | 1/2012 |
| JP | 2012-33365 A | 2/2012 |
| JP | 2014-622547 A | 9/2014 |
| JP | 2017-41434 A | 2/2017 |
| KR | 10-2005-0002708 A | 1/2005 |
| KR | 10-0508945 B1 | 8/2005 |
| KR | 10-2012-0032044 A | 4/2012 |
| KR | 10-2016-0047991 A | 5/2016 |
| KR | 10-2016-0092713 A | 8/2016 |
| KR | 10-2016-0146844 A | 12/2016 |
| KR | 10-2017-0001375 A | 1/2017 |
| WO | WO 02/095849 A2 | 11/2002 |
| WO | WO 2011/018980 A1 | 2/2011 |
| WO | WO 2015/160381 A1 | 10/2015 |

OTHER PUBLICATIONS

Wei et al., "Metal-Sulfur Battery Cathodes Based on PAN-Sulfur Composites", Journal of the American Chemical Society, vol. 137, 2015, pp. 12143-12152.

Ryou et al., "Mechanical Surface Modification of Lithium Metal: Towards Improved Li Metal Anode Performance by Directed Li Plating," Advanced Functional Materials, 2015, vol. 25, pp. 834-841, 8 pages total.

Extended European Search Report for European Application No. 18820233.7, dated May 25, 2020.

* cited by examiner

【Figure 1】
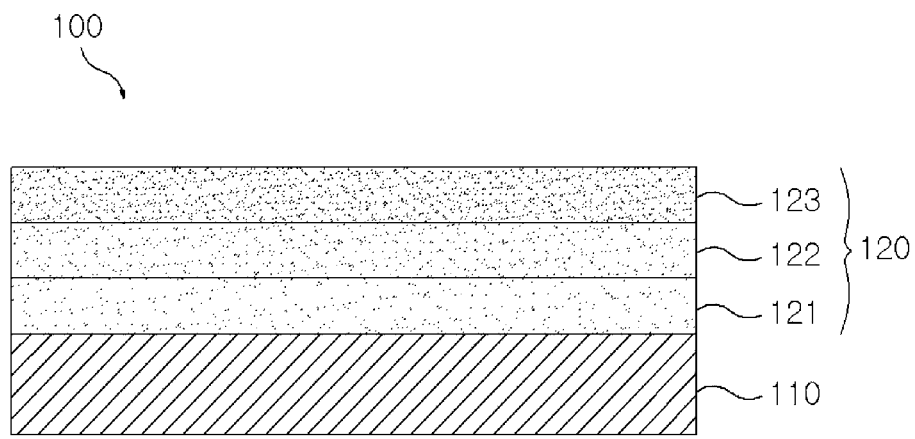
【Figure 2】
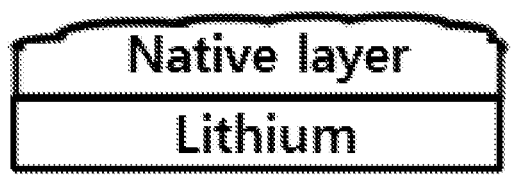
【Figure 3】
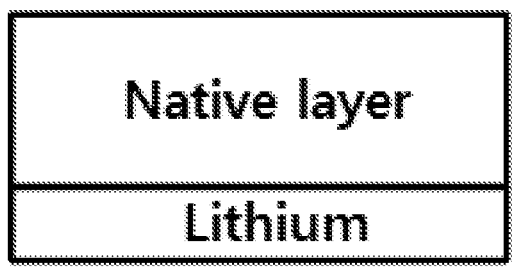

【Figure 4】
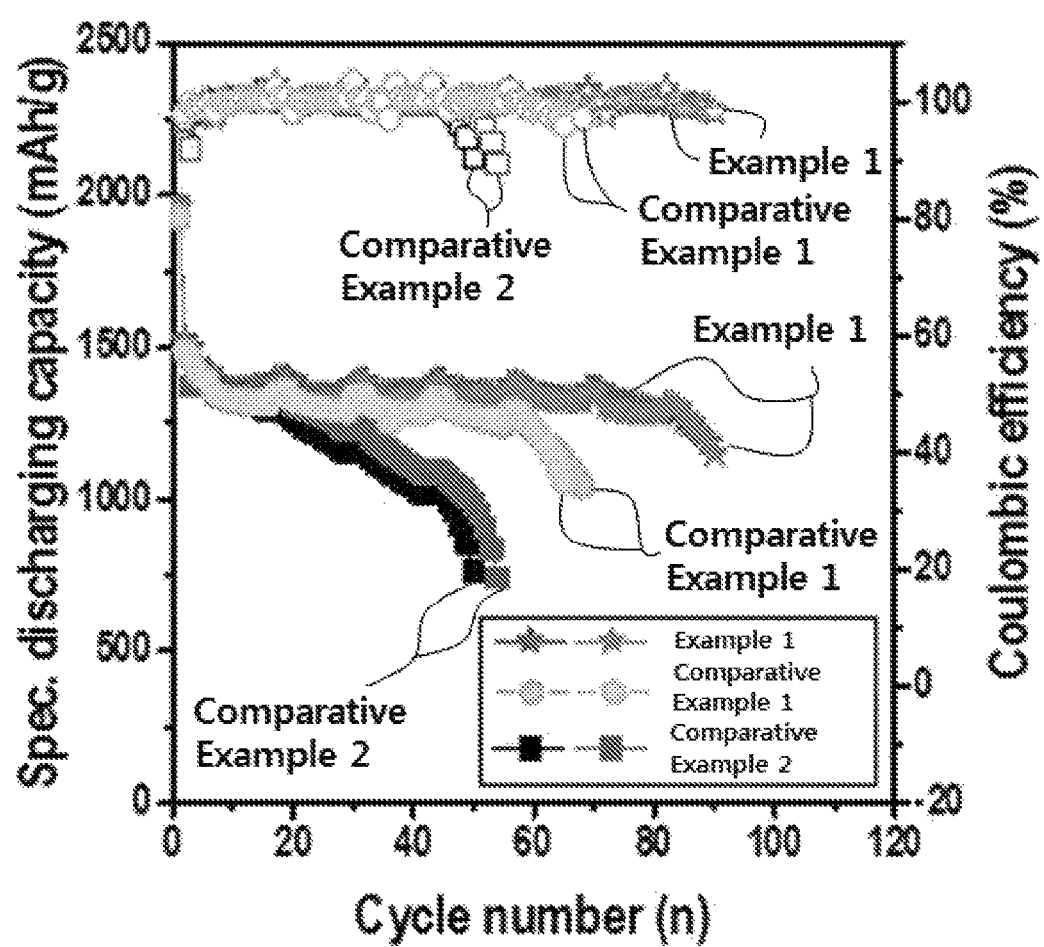

LITHIUM ELECTRODE AND LITHIUM SECONDARY BATTERY INCLUDING SAME

TECHNICAL FIELD

This application claims priority to and the benefits of Korean Patent Application No. 10-2017-0077994, filed with the Korean Intellectual Property Office on Jun. 20, 2017, the entire contents of which are incorporated herein by reference.

The present invention relates to a lithium electrode for enhancing a lifetime of a lithium secondary battery, and a lithium secondary battery including the same.

BACKGROUND ART

Various battery-requiring devices requiring batteries from portable phones, wireless home appliances to electric vehicles have been recently developed, and with the development of such devices, demands for secondary batteries have also increased. Particularly, with the trend of smaller electronic goods, secondary batteries tend to be lighter and smaller as well.

Corresponding to such a trend, lithium secondary batteries using lithium metal as an active material have recently received attention. Lithium metal has a property of low oxidation-reduction potential (−3.045 V with respect to standard hydrogen electrode) and large weight energy density (3,860 mAhg$^{-1}$), and has been expected as a negative electrode material of high capacity secondary batteries.

However, when using lithium metal as a battery negative electrode, the battery is generally manufactured by attaching lithium foil on a planar current collector, and since lithium explosively reacts with water and also reacts with oxygen in the atmosphere with its high reactivity as an alkali metal, there is a disadvantage in that manufacture and use are difficult under general environments. Particularly, an oxide layer such as LiOH, $Li_2O$ and $Li_2CO_3$ is obtained as a result of oxidation when lithium metal is exposed to the atmosphere. When such an oxide layer is present on the surface, the oxide layer functions as an insulator film decreasing electrical conductivity, and causes a problem of an increase in the electric resistance by inhibiting smooth lithium ion migration.

For such a reason, the problem of forming a surface oxide layer caused by lithium metal reactivity has been partly improved by performing a vacuum deposition process in forming a lithium negative electrode, however, fundamental suppression of surface oxide layer formation is still impossible by the exposure to the atmosphere in a battery assembly process. In view of the above, development of a lithium metal electrode capable of resolving a lithium reactivity problem and further simplifying a process while increasing energy efficiency by using lithium metal has been required.

PRIOR ART DOCUMENTS

Patent Documents (Patent Document 1) Korean Patent No. 0508945, "Negative electrode for lithium battery, method for preparing the same and lithium battery including the same"

(Patent Document 2) U.S. Pat. No. 6,025,094, "Protective coatings for negative electrodes"

DISCLOSURE

Technical Problem

As a result of extensive studies in view of the above, the inventors of the present invention have identified that, when controlling surface properties of an oxide layer (native layer) present on a surface of lithium metal and using the result as a negative electrode of a lithium secondary battery, particularly, a lithium-sulfur secondary battery, a lifetime of the lithium-sulfur secondary battery may be enhanced by suppressing side reactions of the lithium metal and polysulfide eluted during charge and discharge of the lithium-sulfur secondary battery.

Accordingly, an aspect of the present invention provides a lithium electrode of which surface is controlled so as to enhance a lifetime of a lithium secondary battery.

Another aspect of the present invention provides a lithium secondary battery with an enhanced lifetime due to a surface-controlled lithium electrode.

Technical Solution

According to an aspect of the present invention, there is provided a lithium electrode including a surface oxide layer (native layer), wherein the surface oxide layer has surface properties defined by the following Sa (arithmetic mean height of surface), Sz (maximum height roughness of surface), Sp (roughness by the number of peaks) and Sdr (degree of interfacial increase).

(i) Sa≥1 μm;
(ii) Sz≥14 μm;
(iii) Sp≥1000 mm$^{-1}$; and
(iv) Sdr≥0.5, wherein the Sa is an arithmetic mean height of a surface, which is a mean value of absolute values of differences between each point with respect to an average surface of a surface, the Sz is maximum height roughness of a surface, which is a distance between a highest point and a lowest point in a single surface, the Sp is roughness by the number of peaks, which is a measure representing steepness of a peak, and the Sdr is a degree of an interfacial increase, which means an increased ratio of a developed area (surface area of measured shape) with respect to an area when looking at the measured area perpendicularly from the above. Specifically, the surface oxide layer may have surface properties defined by 1 μm≤Sa≤2 μm, 15 μm≤Sz≤20 μm, 1000 mm$^{-1}$≤Sp≤1500 mm$^{-1}$ and 0.5≤Sdr≤1.0.

In addition, the surface oxide layer may have a thickness of 50 nm or less, and preferably 10 to 50 nm.

In addition, the surface oxide layer may include one or more types selected from the group consisting of $Li_2O$, LiOH and $Li_2CO_3$.

According to another aspect of the present invention, there is provided a method for preparing a lithium electrode depositing lithium metal on a current collector using a high temperature vacuum deposition method.

In the method for preparing a lithium electrode, surface roughness of the lithium metal increases by applying a rolling and brushing process to the lithium electrode.

The high temperature vacuum deposition method may be performed under 500° C. to 700° C. and 10$^{-3}$ torr to 10$^{-7}$ torr.

According to another aspect of the present invention, there is provided a lithium secondary battery including the lithium electrode.

The lithium secondary battery may be a lithium-sulfur secondary battery, and the lithium-sulfur secondary battery includes the lithium electrode as a negative electrode, and may include a positive electrode including a mixture of sulfur and polyacrylonitrile (S-PAN).

Advantageous Effects

According to the present invention, a lithium electrode having surface properties controlled to be suited for improving a lifetime property of a lithium secondary battery by decreasing a thickness of a surface oxide layer formed on a surface of the lithium electrode and increasing surface roughness can be prepared.

The surface property-controlled lithium electrode can be used as a negative electrode of a lithium secondary battery, and when used as a negative electrode of a lithium-sulfur secondary battery, a stable solid electrolyte interphase (SEI) layer is formed by side reactions between a liquid electrolyte and the lithium negative electrode decreasing non-reversible capacity, and therefore, a lifetime property of a lithium-sulfur secondary battery can be improved.

DESCRIPTION OF DRAWINGS

FIG. 1 is a sectional diagram of a lithium electrode including a surface oxide layer according to the present invention.

FIG. 2 is a sectional diagram of a lithium electrode prepared according to Example 1 of the present invention having surface properties controlled.

FIG. 3 is a sectional diagram of Comparative Example 2 of the present invention having surface properties not controlled.

FIG. 4 is a graph measuring a cycle lifetime when using lithium electrodes of Example 1, and Comparative Examples 1 and 2 as a negative electrode of a lithium-sulfur secondary battery.

BEST MODE

Hereinafter, the present invention will be described in more detail in order to illuminate the present invention.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Lithium Electrode

A lithium electrode prepared using common methods has a surface oxide layer of a few hundred nm produced on the surface.

Such a surface oxide layer is produced by the lithium electrode being exposed to moisture, oxygen and carbon dioxide present under the preparation environment, and since a stable solid electrolyte interphase (SEI) layer may not be formed by the surface oxide layer formed on the lithium electrode, formation of the surface oxide layer needs to be prevented or the form needs to be changed in order to increase lithium efficiency.

In view of the above, the present invention relates to a lithium electrode having surface properties controlled, and, in a lithium electrode including a surface oxide layer, provides a lithium electrode having surface roughness of the surface oxide layer controlled.

(i) Sa≥1 μm;
(ii) Sz≥14 μm;
(iii) Sp≥1000 mm$^{-1}$; and
(iv) Sdr≥0.5,

The surface roughness may be defined by Sa (arithmetic mean height of surface), Sz (maximum height roughness of surface), Sp (roughness by the number of peaks) and Sdr (degree of interfacial increase).

Sa is an arithmetic mean height of a surface, which is a mean of absolute values of differences between each point with respect to an average surface of a surface. As the value decreases, the surface roughness becomes lower. The value is generally used when evaluating surface roughness.

In the present invention, Sa may be Sa≥1 μm, and preferably 1 μm≤Sa≤2 μm. Satisfying the above-mentioned range is advantageous in forming a stable SEI, and when the value is outside the above-mentioned range, SEI formation may be difficult.

Sz is maximum height roughness of a surface, and is a second common roughness parameter. It represents a distance between a highest point and a lowest point on the surface.

In the present invention, Sz may be Sz≥14 μm, and preferably 15 μm≤Sz≤20 μm. Satisfying the above-mentioned range is advantageous in forming a stable SEI, and when the value is outside the above-mentioned range, SEI formation may be difficult.

Sp is roughness by the number of steep peaks, and shows how steep the peaks are. This value being higher means more steep peaks on the surface.

In the present invention, Sp may be Sp≥1000 mm$^{-1}$, and preferably 1000 mm$^{-1}$≤Sp≤1500 mm$^{-1}$. Satisfying the above-mentioned range is advantageous in forming a stable SEI, and when the value is outside the above-mentioned range, SEI formation may be difficult.

Sdr is a developed area ratio of an interface, and represents how much increased the developed area (surface area of measured shape) with respect to an area when looking at the measured area perpendicularly from the above.

In the present invention, Sdr may be Sdr≥0.5, and preferably 0.5≤Sdr≤1.0. Satisfying the above-mentioned range is advantageous in forming a stable SEI, and when the value is outside the above-mentioned range, SEI formation may be difficult.

By the surface oxide layer satisfying Sa, Sz, Sp and Sdr ranges as described above in the lithium electrode according to the present invention, optimal surface roughness capable of forming a stable SEI through side reactions with a liquid electrolyte is obtained, which helps with initial stable SEI formation by improving reactivity between the lithium and the liquid electrolyte.

In addition, the present invention provides a lithium electrode having a thickness controlled as well as surface roughness as surface properties of the lithium electrode.

The surface oxide layer may have a thickness of 50 nm or less and preferably 10 nm to 50 nm.

The thickness of the surface oxide layer concerns lithium electrode reactivity, and when the thickness is greater than 50 nm, an effect of improving a lifetime property of a battery may be insignificant since a stable SEI layer is not formed.

The lithium electrode according to the present invention may be formed on one surface of a current collector, and the surface oxide layer may be formed on the opposite surface of the lithium electrode.

In addition, the surface oxide layer may include one or more types selected from the group consisting of $Li_2O$, LiOH and $Li_2CO_3$.

Structures of such a surface lithium electrode and a surface oxide layer will be described in more detail with reference to the drawing.

FIG. 1 is a sectional diagram of a lithium electrode including a surface oxide layer according to the present invention.

When referring to FIG. 1, the surface oxide layer (120) is formed on one surface of the lithium electrode (100) not adjoining a current collector, and the surface oxide layer (120) of the lithium electrode (100) includes a first oxide layer (121) including $Li_2O$; a second oxide layer (122) including $Li_2O$ and LiOH; and a third oxide layer (123) including $Li_2O$, LiOH and $Li_2CO_3$.

The first oxide layer (121) to the third oxide layer (123) are layers arbitrarily divided according to the oxide composition distribution rather than having their critical planes present. Depths of $Li_2O$, LiOH and $Li_2CO_3$ formed from an outermost surface of the lithium electrode (100) each vary, and depths thereof are in order of $Li_2O$>LiOH>$Li_2CO_3$.

More specifically, the distance from the outermost surface to a spot where $Li_2O$ presents is defined as the first oxide layer (121), and the thickness may be from 10 nm to 50 nm, and preferably from 8 nm to 30 nm.

In addition, the distance from the outermost surface layer to a spot where LiOH presents is defined as the second oxide layer (122), and the thickness may be from 1 nm to 10 nm, and preferably from 3 nm to 10 nm.

In addition, the distance from the outermost surface layer to a spot where $Li_2CO_3$ presents is defined as the third oxide layer (123), and the thickness may be from 1 nm to 5 nm, and preferably from 0.5 nm to 1 nm.

The lithium metal layer (110) is a layer remaining after forming the surface oxide layer (120) in the lithium electrode (100), and means a metal layer including a lithium metal element. Materials of the lithium metal layer may include lithium alloys, lithium metal, oxides of lithium alloys or lithium oxides. As nonlimiting examples, the negative electrode may be a thin film of lithium metal, or an alloy of lithium and one or more types of metals selected from the group consisting of Na, K, Rb, Cs, Fr, Be, Mg, Ca, Sr, Ba, Ra, Al and Sn. Herein, the lithium metal layer (110) may be partly changed by oxygen or moisture besides the surface oxide layer (120), or may include impurities.

The thickness of the lithium electrode (100) including the lithium metal layer (110) and the surface oxide layer (120) may be from 0.01 μm to 100 μm, preferably from 0.05 μm to 75 μm and more preferably from 0.1 μm to 50 μm. When the thickness is less than 0.01 μm, it is difficult to satisfy a cycle property due to insufficient lithium efficiency, and the thickness being greater than 100 μm causes a problem of reducing energy density with an increase in the lithium thickness.

Lithium Secondary Battery

The present invention also relates to a lithium secondary battery including a lithium electrode having surface properties controlled by a thickness and surface roughness of a surface oxide layer as described above.

The surface property-controlled lithium electrode may be used as a negative electrode of a lithium-sulfur secondary battery.

Herein, a positive electrode of the lithium-sulfur secondary battery may include a mixture of sulfur (S) and polyacrylonitrile (PAN), and specifically, a mixture (S-PAN) obtained through heat treatment.

When using the S-PAN compared to a S/C composite generally normally used as a positive electrode material of a lithium-sulfur secondary battery, an effect of drastically reducing an amount of charge and discharge polysulfide elution of a lithium-sulfur secondary battery is obtained.

This is a phenomenon obtained by sulfur elements or short-chain sulfurs covalently bonding to a carbonized polymer backbone in an evenly dispersed form, and thereby suppressing polysulfide production from a positive electrode including S-PAN during discharge.

In view of the above, when using the surface property-controlled lithium metal as a negative electrode of a lithium-sulfur secondary battery, side reactions with polysulfide partly produced from a S-PAN positive electrode in which polysulfide production is suppressed are also reduced, and an effect of improving a lifetime property of a battery may be maximized.

Such a surface-controlled lithium electrode may be prepared using a method for preparing a lithium electrode as follows.

Lithium is deposited on a current collector through a high temperature vacuum deposition method using a lithium source. Herein, the lithium source may be lithium ingot, and the current collector may be copper foil. Herein, the high temperature vacuum deposition method may be performed under a condition of 500° C. to 700° C. and $10^{-7}$ torr to $10^{-3}$ torr, and under such a condition, lithium deposition may be efficiently achieved.

A lithium electrode may be prepared by performing deposition so as not to form a surface oxide layer in the deposited lithium layer, then transferring the result from a vacuum chamber into a glove box in which $Ar/CO_2$ mixture gas is distributed, and storing the result for a certain period of time.

As described above, surface roughness of the oxide layer may increase enough to produce side reactions with a liquid electrolyte using only a deposition process, however, in order to further increase surface roughness, a rolling and brushing method may also be used.

MODE FOR INVENTION

The embodiments are obvious to those skilled in the art, and it is obvious that such modifications and changes also belong to the scope of the attached claims.

Example 1

A surface property-controlled lithium electrode as illustrated in FIG. 2 was prepared.

In a vacuum chamber, using copper foil as a current collector, lithium was deposited on a surface of the copper foil using a high temperature vacuum deposition method under 600° C. and $10^{-5}$ torr, and the result was stored in a glove box filled with $Ar/CO_2$ mixture gas to prepare a lithium electrode having an oxide layer of 50 nm.

Example 2

A lithium electrode was prepared in the same manner as in Example 1, except that a rolling and brushing process was further performed on the lithium electrode to increase surface roughness.

Comparative Example 1

A lithium electrode was prepared in the same manner as in Example 1, except for being stored for 4 days in a dry room, the thickness of the oxide layer was increased to approximately 100 nm, and surface roughness was naturally formed accordingly.

Comparative Example 2

A lithium electrode having surface properties not controlled as illustrated in FIG. 3 was prepared.

Experimental Example 1: Measurement of Thickness and Surface Roughness of Surface Oxide Layer For the lithium electrodes each prepared in Examples 1 and 2 and Comparative Examples 1 and 2, a thickness and surface roughness of the surface oxide layer were measured, and the results are described in Table 1.

Herein, the thickness of the surface oxide layer was measured through an X-ray photoelectron spectroscopy (XPS) depth-profile, and the surface roughness of the surface oxide layer was measured using laser confocal microscope equipment.

TABLE 1

| | | Surface Properties of Oxide Layer | | | |
| --- | --- | --- | --- | --- | --- |
| | | | Surface Roughness | | |
| | Thickness | Sa (μm) | Sz (μm) | Sp (mm$^{-1}$) | Sdr |
| Example 1 | 50 nm | 1.2 ± 0.03 | 14.1 ± 0.09 | 1255.5 ± 107.13 | 0.8 ± 0.01 |
| Comparative Example 1 | 100 nm | 1.2 ± 0.03 | 13.3 ± 0.16 | 1100.8 ± 100.03 | 0.8 ± 0.03 |
| Comparative Example 2 | 100 nm | 0.9 ± 0.02 | 10.2 ± 0.57 | 967.9 ± 166.61 | 0.4 ± 0.08 |

Based on the result, it was seen that, as described in Table 1, Example 1 had a reduced surface oxide layer thickness and increased surface roughness compared to Comparative Examples 1 and 2.

Experimental Example 2: Measurement of Non-Reversible Capacity

In a lithium-sulfur secondary battery including a positive electrode including S-PAN as a positive electrode material, each of the lithium electrodes prepared in Examples 1 and 2 and Comparative Examples 1 and 2 was used as a negative electrode, and battery capacity was evaluated while charging and discharging in a voltage range of 4.3 V to 2.5 V. The results are described in Table 2.

TABLE 2

| | Second Charging Capacity (mAh/g) | Third Discharging Capacity (mAh/g) | Efficiency (%) |
| --- | --- | --- | --- |
| Example 1 | 1470 | 1465 | 99.7 |
| Comparative Example 1 | 1504 | 1495 | 99.4 |
| Comparative Example 2 | 1488 | 1370 | 92 |

Experimental Example 3: Measurement of Cycle Lifetime of Lithium-Sulfur Secondary Battery In a lithium-sulfur secondary battery including a positive electrode including S-PAN as a positive electrode material, each of the lithium electrodes prepared in Examples 1 and 2 and Comparative Examples 1 and 2 was used as a negative electrode, and a cycle lifetime was measured. A condition of charge and discharge was as follows.

Charge and discharge driving: 0.1 C 2.5 times→[0.2 C 3 times→0.3 C/0.5 C 10 times]n The number of cycles when discharging capacity reached 80% compared to initial capacity of the battery was measured while repeating cycles under the above-mentioned condition.

FIG. 4 is a graph measuring a cycle lifetime when using the lithium electrodes of Example 1, and Comparative Examples 1 and 2 as a negative electrode of the lithium-sulfur secondary battery.

When referring to FIG. 4, it was seen that, a lifetime property of the lithium electrode was significantly higher in Example 1 having a reduced surface oxide layer thickness and increased surface roughness compared to in Comparative Examples 1 and 2.

Accordingly, it was seen that surface roughness and thickness of the surface oxide layer were closely related to a battery lifetime property, and it was identified that a battery lifetime property was enhanced when surface roughness increases or thickness of the surface oxide layer decreases.

Hereinbefore, the present invention has been described with limited examples and drawings, however, the present invention is not limited thereto, and various modifications and changes may be made by those skilled in the art within technological ideas of the present invention and the range of equivalents of the attached claims to describe below.

[Reference Numeral]
100: Lithium Electrode
110: Lithium Metal Layer
120: Surface Oxide Layer
121: First Oxide Layer
122: Second Oxide Layer
123: Third Oxide Layer

The invention claimed is:
1. A lithium electrode, comprising:
a current collector;
a lithium metal layer; and
an oxide layer,
wherein the oxide layer is a native layer, and
wherein the oxide layer is present on a surface of the lithium metal layer;
wherein a surface of the oxide layer has surface properties measured by laser confocal microscopy and defined by the following Sa (arithmetic mean height of surface), Sz (maximum height roughness of surface), Sp (roughness by a number of peaks) and Sdr (degree of interfacial increase):

(i) Sa≥1 µm;
(ii) Sz≥14 µm;
(iii) Sp≥1000 mm$^{-1}$; and
(iv) Sdr≥0.5, wherein, the Sa is an arithmetic mean height of the surface of the oxide layer, wherein the Sz is a maximum height roughness of the surface of the oxide layer, which is a distance between a highest point and a lowest point on the surface of the oxide layer, wherein the Sp is the number of peaks, and wherein the Sdr is a degree of an interfacial increase, wherein the oxide layer consists of a first oxide layer, which consists of $Li_2O$; a second oxide layer, which consists of $Li_2O$ and LiOH; and a third oxide layer, which consists of $Li_2O$, LiOH and $Li_2CO_3$, wherein the first oxide layer has a thickness of 10 nm to 50 nm, the second oxide layer has a thickness of 1 nm to 10 nm, and the third oxide layer has a thickness of 1 nm to 5 nm, and wherein the oxide layer is formed under vacuum by flowing $Ar/CO_2$ mixture gas over the lithium metal layer, and the oxide layer is rolled and brushed.

2. The lithium electrode of claim 1, wherein the oxide layer has surface properties defined by 1 µm≤Sa≤2 µm, 15 µm≤Sz≤20 µm, 1000 mm$^{-1}$≤Sp<1500 mm$^{-1}$ and 0.5≤Sdr≤1.0.

3. The lithium electrode of claim 1, wherein the oxide layer has a thickness of 50 nm or less.

4. The lithium electrode of claim 3, wherein the oxide layer has a thickness of 10 nm to 50 nm.

5. A lithium secondary battery comprising the lithium electrode of claim 1.

6. The lithium secondary battery of claim 5, which is a lithium-sulfur secondary battery.

7. The lithium secondary battery of claim 6, wherein the lithium-sulfur secondary battery comprises the lithium electrode as a negative electrode, and comprises a positive electrode, which comprises a mixture of sulfur and polyacrylonitrile (S-PAN).

* * * * *